US011795415B2

(12) United States Patent
Godfroid et al.

(10) Patent No.: US 11,795,415 B2
(45) Date of Patent: Oct. 24, 2023

(54) DEVICE FOR AN ELECTRICAL PROCESSING OF A FATTY SUBSTANCE OF PLANT ORIGIN

(71) Applicant: Green Frix, Blandain (BE)

(72) Inventors: Thomas Godfroid, Strépy-Bracquegnies (BE); Loïc Poussard, Bruay sur l'Escaut (FR); Mireille Poelman, Arbre (BE); Sophie Peeterbroeck, Virginal-Samme (BE); Frédéric Danneaux, Lasne (BE); Jean Patrick Holvoet, Saint-Sauveur (BE); Matthieu Michiels, Ghlin (BE)

(73) Assignee: Green Frix, Blandain (BE)

( * ) Notice: Subject to any disclaimer, the term of this patent is extended or adjusted under 35 U.S.C. 154(b) by 296 days.

(21) Appl. No.: 17/334,750

(22) Filed: May 30, 2021

(65) Prior Publication Data

US 2021/0309933 A1 Oct. 7, 2021

Related U.S. Application Data

(62) Division of application No. 16/311,721, filed as application No. PCT/EP2017/066330 on Jun. 30, 2017, now Pat. No. 11,053,453.

(30) Foreign Application Priority Data

Jun. 30, 2016 (BE) .................................. 2016/5519

(51) Int. Cl.
*C01B 3/00* (2006.01)
*C11B 3/00* (2006.01)
(Continued)

(52) U.S. Cl.
CPC ........... *C11B 3/005* (2013.01); *C10M 101/04* (2013.01); *C10M 159/08* (2013.01);
(Continued)

(58) Field of Classification Search
CPC ... C11B 3/005; C10M 101/04; C10M 159/08; C10M 177/00; C10M 2207/40;
(Continued)

(56) References Cited

U.S. PATENT DOCUMENTS 2,071,551 A 2/1937 Matheson
2,437,067 A 3/1948 Bingley
(Continued)

FOREIGN PATENT DOCUMENTS

CN 102465003 5/2012
CN 203866276 10/2014
(Continued)

OTHER PUBLICATIONS

Notice of Allowance dated Mar. 11, 2021 From the US Patent and Trademark Office Re. U.S. Appl. No. 16/311,721. (7 Pages).
(Continued)

*Primary Examiner* — Xiuyu Tai

(57) ABSTRACT

The present invention relates to a device for electrically processing a fatty substance of plant origin, comprising a series of electrodes (1 and 2) and an enclosure (4), said device being characterised in that the enclosure (4) is provided with at least one electrical connector (5) placed on the outer surface (40) of the enclosure (4), a series of electrical connections for connecting each electrode of said series of electrodes to said electrical connector (5), with the current flow distances of the electrical connections being equal in relation to each other, and a first inlet (6) and a first outlet (7) for the fatty substance, and in that said device comprises a filter (12) having an inlet (13) in fluidic connection with said first fatty-substance outlet (7) of the enclosure (4) and an output (14) in fluidic connection with said first fatty-substance inlet (6) of the enclosure (4).

18 Claims, 7 Drawing Sheets

(51) Int. Cl.

| | |
|---|---|
| ***C10M 177/00*** | (2006.01) |
| ***H05H 1/24*** | (2006.01) |
| ***C11C 3/00*** | (2006.01) |
| ***C10M 159/08*** | (2006.01) |
| ***C10M 101/04*** | (2006.01) |
| *C10N 60/02* | (2006.01) |
| *C10N 70/00* | (2006.01) |

(52) U.S. Cl.

CPC ............ *C10M 177/00* (2013.01); *C11C 3/00* (2013.01); *H05H 1/2406* (2013.01); *C10M 2207/40* (2013.01); *C10M 2207/401* (2013.01); *C10N 2060/02* (2013.01); *C10N 2070/00* (2013.01); *H05H 1/2437* (2021.05)

(58) Field of Classification Search

CPC .. C10M 2207/401; C11C 3/00; H05H 1/2406; H05H 1/2437; C10N 2060/02; C10N 2070/00; C01B 13/10; C02F 1/4608; C02F 2201/46; C02F 2101/308; C02F 2305/023; Y02W 10/37; C07C 407/00; C07C 409/24; C07C 409/34; B01J 19/088; B01J 2219/0869; B01J 2219/0849; B01J 2219/0835; B01J 2219/0875; B01J 2219/0815; B01J 2219/0809; B01J 2219/0877; B01J 2219/0894; B01J 2219/0841; B01J 2219/0884

See application file for complete search history.

(56) References Cited

U.S. PATENT DOCUMENTS

| | | | |
|---|---|---|---|
| 5,217,605 | A | 6/1993 | Kottke |
| 5,482,633 | A | 1/1996 | Muraldihara et al. |
| 8,066,889 | B2 | 11/2011 | Bivens et al. |
| 2009/0250414 | A1 | 10/2009 | Bivens et al. |
| 2014/0014496 | A1 | 1/2014 | Yinanc et al. |
| 2019/0203153 | A1 | 7/2019 | Godfroid et al. |

FOREIGN PATENT DOCUMENTS

| | | |
|---|---|---|
| CN | 104726203 | 6/2015 |
| DE | 185931 | 6/1904 |
| DE | 234543 | 4/1909 |
| EP | 2153851 | 2/2010 |
| EP | 2549840 | 1/2013 |
| FR | 363078 | 7/1906 |
| GB | 07101 | 5/1905 |
| GB | 407379 | 3/1934 |
| GB | 488026 | 6/1938 |
| GB | 490127 | 8/1938 |
| JP | 090175 | 9/1930 |
| JP | 175139 | 10/1948 |
| JP | 30-002381 | 8/1952 |
| JP | 2005-529455 | 9/2005 |
| WO | WO 03/096767 | 11/2003 |

OTHER PUBLICATIONS

Official Action dated Nov. 24, 2020 From the US Patent and Trademark Office Re. U.S. Appl. No. 16/311,721. (14 Pages).

Rapport de Recherche Internationale et l'Opinion Ecrite [International Search Report and the Written Opinion] dated Jul. 31, 2017 From the International Searching Authority Re. Application No. PCT/EP2017/066330 and Its Translation of Search Report Into English. (11 Pages).

Restriction Official Action dated Sep. 4, 2020 From the US Patent and Trademark Office Re. U.S. Appl. No. 16/311,721. (7 Pages).

Third-Party Submission dated Oct. 4, 2020 to the US Patent and Trademark Office Re. U.S. Appl. No. 16/311,721. (3 Pages).

Translation of Notification of Reason for Refusal dated Oct. 6, 2020 From the Japan Patent Office Re. Application No. 2018-569095.

Boelhouwer et al. "Polymerization of Linseed Oil in An Electrical Discharge", Journal of the American Oil Chemists' Society, 37(7): 373-376, Jul. 1960.

Britannica Online Encyclopedia "Electrical Impedance", Britannica Online Encyclopedia, 2 P., Jun. 27, 2008.

Current and Resistance "Electrical Resistance", Current and Resistance, 5 P., Jul. 12, 1999.

Nanjing Suman Electronics "Power Supply for Low Temperature Plasma Experiments", Nanjing Suman Electronics Co., Ltd, 1 P., Feb. 26, 2019 & English Translation.

National Grid "Strategy Paper—Transmission Lincence Special Condition 2K: Electricity Transmission Losses", National Grid Electricity Transmission, Reporting Period Apr. 1, 2013 to Mar. 31, 2021, p. 1-35, Nov. 2013.

Reece Roth et al. "Treatment of Metals, Polymer Films, and Fabrics With A One Atmosphere Uniform Glow Discharge Plasma (OAUGDP) for Increased Surface Energy and Directional Etching", Acta Metallurgica Sinica, 14(6): 391-407, Dec. 2001.

Reliability Direct "Viscosity Converting Chart: A Converting Table Between Viscosity Units Like Centiposes, MilliPascal, CentiStokes and SSU", Reliability Direct, 3 P.

Salem et al. "Impedance Matching for Optimization of Power Transfer in A Capacitively Excited RF Plasma Reactor", The European Physical Journal, Applied Physics, 3(1): 91-95, Jul. 1998.

Whiteley et al. "Lubricants Produced by Reactions in Glow Discharge", Industrial and Engineering Chemistry, 42(12): 2471-2479, Dec. 1, 1950.

DEVICE FOR AN ELECTRICAL PROCESSING OF A FATTY SUBSTANCE OF PLANT ORIGIN

RELATED APPLICATIONS

This application is a Division of U.S. patent application Ser. No. 16/311,721 filed on Dec. 20, 2018, which is a National Phase of PCT Patent Application No. PCT/EP2017/066330 having International filing date of Jun. 30, 2017, which claims the benefit of priority of Belgium Patent Application No. 2016/5519 filed on Jun. 30, 2016. The contents of the above applications are all incorporated by reference as if fully set forth herein in their entirety.

FIELD AND BACKGROUND OF THE INVENTION

The present invention relates to a device for an electrical processing of a fatty substance of plant origin.

The term "fatty substance" according to the present invention refers to substances composed of molecules having hydrophobic properties and being mainly composed of triglycerides. Triglycerides are esters formed of a glycerol molecule and three fatty acids. These fatty substances comprise oils, waxes and fats. In the scope of the present invention, the oils are preferred as they are in a liquid state at room temperature since they are mainly composed of unsaturated fatty acids and thus have low melting points, that is less than or equal to room temperature. The fats and waxes are, on the other hand, pasty or solid at room temperature as they have a melting point which is higher than room temperature, as they are mainly formed of saturated fatty acids. The melting point being higher for fats and waxes, their use in the device according to the present invention must preferably be carried out at a temperature which is higher than room temperature, so they are in liquid form.

Electrical discharge processing by electrical discharge of an oil of plant or mineral origin in liquid form, also known as voltolisation, is a method involving electrical discharges so-called silencers. The electrical discharges are produced between two metal electrodes or a series of parallel metal electrodes which are separated by an electrical insulator, also known as dielectric material. The application of an alternating electrical voltage between the electrodes allows a plasma to be created between them, through the dielectric material. This plasma enables the processing of the oil in the form of film on the surface of the electrodes and the dielectric.

It is known from the prior art, particularly in document FR363078, to rely on an electrical processing device to eliminate the characteristic unpleasant smell of fish oil. In this document, the fish oil is contained in a cylindrical enclosure and is in contact with hydrogen. The hydrogen then binds itself to the fish oil following electrical discharges applied between the electrodes in the enclosure, thus allowing the unpleasant smell of fish oil to be gradually removed.

The hydrogen consumed during that reaction is quickly and manually reintroduced into the enclosure thanks to a tap provided for this purpose. The operating conditions for this processing of fish oil are not described in the document.

Evidence was then given in the prior art that an electric processing of liquid organic material enabled the physicochemical properties thereof to be modified. This method was therefore also applied in the past to "thicken" vegetable or mineral oils or a mixture thereof, in order to procure properties suitable for use as additives in lubricants.

A device known for electrical processing of liquid organic material comprises a series of electrodes comprising a number n of substantially parallel electrodes (1 and 2), where $n \geq 2$, each electrode being arranged to be connected to a high-voltage source and/or to ground, a series of dielectric material elements comprising n+1 dielectric material elements substantially parallel to said electrodes and placed on either side of each electrode of the series of electrodes, so that each electrode is between two dielectric material elements, an enclosure arranged to receive said fatty substance and encircling said series of electrodes and said series of dielectric material elements and an immersion device of said series of electrodes and said series of dielectric material elements arranged to at least partially submerge said series of electrodes and said series of dielectric materials.

Document GB407379 describes a device for processing hydrocarbon oils and paraffins by means of electrical discharges. The device for electrical discharge processing (voltolisation) illustrated in this document is a condenser, in the form of a tube, containing a plurality of metal plates placed in series, separated from one another by glass plates.

The metal plates are alternatively connected to a high-frequency current source, which means that when a first metal plate is connected to a high-frequency current source, the second opposing metal plate serves as the ground electrode. A glass plate is then situated between a metal plate connected to a current source and a metal plate serving as the ground electrode. The glass plates may be rotated around a central axis of the condenser. The metal plates and the glass plates are submerged in the hydrocarbon to be processed.

A similar device for applying electrical discharges to a liquid is also described in document GB190507101. The device described in this document is also composed of a cylindrical enclosure which can be rotated in which the gas pressure can be kept relatively constant thanks to a complementary device having a mercury manometer. In this way, when the gas pressure in the enclosure, measured by the mercury manometer, drops, gas can be reintroduced into the enclosure. Therefore, the gas pressure in the enclosure increases to return to its initial value so that the gas pressure in the enclosure is kept relatively constant.

A series of metal discs and discs of insulating material are alternately placed on a rotating shaft of the enclosure, that is they are placed successively along the rotating shaft as follows: a metal disc, a disc of insulating material, a metal disc, a disc of insulating material, and so on. The insulating material, also known as dielectric material, placed between the electrodes allows the formation of local arcing to be reduced, which could cause a too-intensive local processing of the liquid, resulting in the deterioration of the processed liquid.

However, no condition of use for this device is disclosed in this document.

Unfortunately, the previous devices give very random results when they are used to process vegetable or mineral oils. The physicochemical properties of the processed oils are neither predictable nor controllable/controlled. In addition, the implementation of the devices disclosed is not described, which does not allow there to be any industrial development. After long developments to reproduce the technology disclosed in documents GB407379 and GB190507101, it became apparent that industrial development of the devices disclosed was not possible as the operational conditions which were not disclosed were unique and gave random results.

SUMMARY OF THE INVENTION

The inventors of the present patent application have thus researched and developed a device which is capable of being developed industrially and wherein the electrical processing of the fatty substance of plant origin is controlled and reproducible while improving the effectiveness of the processing.

To solve this problem, the invention provides a device as indicated in the beginning wherein the enclosure is also provided with at least one electrical connector placed on the outer surface of the enclosure, a series of electrical connections comprising at least n electrical connections in such a way as to connect said electrodes of said series of electrodes to said electrical connector, each electrical connection having a predetermined current flow distance, the current flow distances of the electrical connections being equal to one another, a first inlet for the fatty substance and a first outlet for the fatty substance and a second inlet for a first gas and a second outlet for a second gas, said device further comprising a high-voltage source connected to said electrical connector to supply said first electrode and a filter having an inlet in fluid connection with said first fatty substance inlet of the enclosure.

In the following description, the expression "fatty substance of plant origin" will be, for reasons of simplicity, also occasionally expressed by the terms "fatty substance" "vegetable oil" or simply oil. The term "oil" is used for reasons of simplicity, as the fatty substance used according to the present invention is in liquid form, whether it comes from a vegetable oil or a vegetable fat or wax. As explained above, when a fat or a wax is used, the operating temperature is preferably adapted so the fatty substance is in liquid form. The term "oil", according to the present invention, can thus be a vegetable oil, fat or wax in liquid form.

The fatty substances of plant origin come from, for example, rapeseed, flaxseed, argan, etc.

Preferably, it is a fatty substance of plant origin having a pre-processing iodine value ranging between 100 and 180 mg.

According to the present invention, the term "high voltage" refers to a voltage, also known as a potential, preferably ranging between 500V and 10 kV and characterised by a low alternating current of which the current density is preferably between 0.5 and 2 $mA/cm^2$ and of which the frequency is advantageously between 1 kHz and 500 kHz.

According to the present invention, the device comprises a series of electrodes comprising at least two electrodes in such a way that, when a first electrode is supplied with a current, a second electrode serves as the ground electrode.

The alternating current applied to the electrodes is a current which changes direction twice per period. Therefore, when an alternating current is applied to the electrodes of the device according to the invention, all the electrodes are connected to the high-voltage source. In this way, the current arrives at a first electrode while a second electrode serves as the ground electrode and inversely when the current changes direction, the second electrode is supplied with a current while the first electrode serves as the ground electrode, and so on with every change of direction of the current.

It is also possible to alternately connect a first electrode to the high-voltage source and a second electrode to ground so as to have a dielectric material element, an electrode connected to the high-voltage source, a dielectric material element, an electrode connected to the high-voltage source and a dielectric material element, and so on.

In order to improve the reproducibility and control of the electrical processing of the fatty substance of plant origin during the implementation of the device according to the present invention, the inventors have surprisingly noticed that, ideally, any loss of energy must be reduced and the current flow maximised by making the current flow distance symmetrical between the high-voltage source and the electrodes of the series of electrodes. Thus, surprisingly, it has been speculated that this maximisation could take place, not necessarily at the high-voltage source but within the enclosure itself. The electrodes being placed substantially parallel to one another in the enclosure of the device, it was not obvious to make the current flow distance symmetrical between the high-voltage source and each electrode.

Indeed, in the configuration of the device according to the present invention, the electrical connector placed on the outer surface of the enclosure is thus, on the one hand, connected to a high-voltage source, for example to an electrical transformer, and on the other hand to the electrodes of the series of electrodes.

The electrodes being placed parallel to one another in the enclosure, they are further and further away from the electrical connector placed on the outer surface of the enclosure and the electrical connections tend to be longer for the electrodes which are further away from the electrical connector than for those which are in a closer environment.

In the device according to the present invention, as mentioned previously, each electrical connection having a predetermined current flow distance, the current flow distances of the electrical connections are equal to one another. The electrodes are thus connected to the electrical connector by means of electrical connections of identical length, so the distance covered by said electrical connector and the electrodes of the series of electrodes is identical for each electrode.

The term "make the current flow distance between the high-voltage source and each electrode symmetrical" means, according to the present invention, that the current flow distance (covered by the current) between the high-voltage source and the electrodes is identical for each electrode. The symmetrisation of the current flow distance further allows the energy losses to be limited and the control of the current applied to the electrodes to be improved.

In this way, thanks to the device according to the present invention, for each electrode of the series of electrodes, the current covers the same distance between the high-voltage source and said electrode. Consequently, the current is distributed in a more homogeneous way to each electrode of the series of electrodes.

This better distribution of the current further allows the side effects of an electrode which could cause a non-homogeneous distribution of the current to this electrode to be limited. By thus preventing the non-homogeneous distribution of the current to an electrode, itself, in turn, causing the formation of electrical arcs and a non-homogeneous processing of the vegetable oil present in the form of film on the surface of this electrode and the dielectric material elements is avoided.

The current losses being limited and identical for each electrode and the control of the amount of current applied to the electrodes being improved, the uniformity of the electrical discharge between the electrodes through a dielectric material element is improved.

Furthermore, the current losses connected to a phase shift are limited, which allows temperature rises during the oil processing to be reduced. The temperature rises being limited, it is no longer necessary to use a restrictive and costly cooling device as described in the prior art.

As the fatty substance is in the form of a film on the surface of the electrodes and dielectric material elements, the processing of this fatty substance is also more uniform thanks to the device according to the present invention. This processing uniformity further allows the reduction of the formation of local electrical arcs to be further improved which, as explained above, causes a too-intensive local processing of the oil, resulting in the deterioration of the processed fatty substance.

Consequently, the processing of the fatty substance in the device according to the present invention is faster and more effective while allowing the physicochemical properties of the fatty substance resulting from the processing to be controlled.

However, as it has been described in documents FR828933 and GB488026, the application of a too-intensive processing to a vegetable oil leads to the too-quick thickening of the oil and may cause the formation of insoluble agglomerate, and thus the formation of a sediment. In addition, the devices of the prior art are not adapted for the processing of all vegetable oils. In fact, document FR828933 advises avoiding the use of flaxseed oil or Tung oil, while document GB488026 reports the formation of a jelly following the processing of a mixture of rapeseed oil with a mineral oil.

According to the present invention, despite the application of an intense and very effective plasma to the oil, which may lead to a punctual and localised thickening of the oil, the viscosity qualities of the processed oil are homogeneous throughout the liquid vegetable phase. In fact, the device according to the invention is provided with a circulation outside the enclosure. The presence of a first inlet and a first outlet for the liquid fatty substance in the enclosure allows the liquid fatty substance to circulate outside the enclosure and to pass through a filter, for example, a metal filter, placed outside the enclosure. The circulation of the oil outside the enclosure and its passage through a filter allows the homogeneity of the processed material to be maintained following the intense and effective plasma applied to the oil. For example, the filter has meshes whose size ranges between 0.5 and 1 mm, preferably around 0.8 mm. Advantageously, the filter is a metal filter.

The circulation of the fatty substance outside the enclosure and its passage between the filter meshes thus further allows the aggregates or the agglomerates which could have formed in the fatty substance during the processing by the intense and effective plasma obtained in the enclosure of the device according to the present invention to be eliminated. In fact, the filter meshes allow the size of the aggregates or the agglomerates to be retained and/or reduced in order to homogenise the oil and avoid the formation of aggregates or agglomerates which are too large, which could lead to the gelation of the fatty substance.

It has been shown in the scope of the present invention that there was thus a synergy between the presence of the electrical connector on the enclosure and the symmetrisation of the current flow distance between the high-voltage source and the electrodes and the circulation of the fatty substance outside the enclosure and its passage through a filter. In fact, the result is an improvement of the control and reproducibility of the electrical processing of the liquid fatty substance while improving the effectiveness of this processing.

Another completely unexpected advantage of the device according to the present invention is that this also allows the characteristic odour of vegetable oils to be reduced, or even eliminated. As mentioned above, the prior art discloses the devices and methods for voltolisation of fish oil to reduce its characteristic odour. The implementation of the present device allows, in and of itself, the odour from fatty substances of plant origin to be reduced, or even eliminated. This reduction of the odour from fatty substances of plant origin is, for example, advantageous for applications in the cosmetic or food fields where too-strong odours from fatty substances of plant origin used as a lubricating base are to be avoided.

The device according to the present invention therefore allows a fatty substance of plant origin processed by electrical discharges to be produced and reproduced with controllable, controlled and, advantageously, deodorised features.

Preferably, n is greater than or equal to 4, advantageously greater than or equal to 5, more preferentially greater than or equal to 6, more advantageously greater than or equal to 7. The increase in the number of electrodes and the number of dielectric materials allows the effectiveness of the processing of the fatty substance to be increased by increasing the contact surface between the electrical discharge and the fatty substance present in the form of a film on the electrodes and the dielectric material elements.

The enclosure according to the present invention is advantageously a cylindrical metal enclosure, preferably made of stainless steel.

In a particular embodiment of the device according to the invention, the enclosure is a parallelepiped enclosure, preferably made of stainless steel.

Advantageously, the device has at least one electrode, preferably each electrode of the series of electrodes, which is a metal plate having a thickness ranging between 0.5 mm and 5 mm, preferably between 1 mm and 3 mm.

For example, the metal used to make the electrodes is a metal which does not degrade in the face of corrosion, such as, for example, stainless steel or aluminium.

In a particular embodiment of the device according to the invention, at least one electrode, preferably each electrode, is a metal disc with a diameter ranging between 5 and 40 cm, preferably between 10 and 30 cm and a thickness ranging between 0.5 and 10 mm, preferably between 1 and 3 mm.

In another embodiment, at least one electrode, preferably each electrode, is a polygon, preferably a rectangle having a thickness ranging between 0.5 and 10 mm, preferably between 1 and 3 mm.

Preferably, the immersion device of the device according to the invention further comprises a rotating shaft attached to said electrodes and attached to said dielectric material elements.

Preferably, the rotating shaft is attached to the enclosure.

In this particular embodiment, the electrodes and the dielectric material elements are arranged along the rotating shaft. Along the rotating shaft, the following are thus placed successively: a dielectric material element, a first electrode, an element of dielectric material, a second electrode, a dielectric material element, and so on. The electrodes and the dielectric materials have a common axis of rotation positioned on the rotating shaft.

This device configuration therefore particularly provides rotation of the enclosure and/or the electrodes and the dielectric material elements.

In this way, a relatively homogeneous film of fatty substance forms on the surface of the electrodes and the dielectric material elements, which then improves the effectiveness of the processing and the maintenance of a liquid whose physicochemical properties are more homogeneous.

In another embodiment of the device according to the invention, the immersion device further comprises, in the enclosure, a disc fixed to the rotating shaft and arranged to be rotated by said shaft and provided with a series of blades positioned peripherally on said disc, each of said blades having a longitudinal axis parallel to an axis of rotation of said disc, said disc having a common axis of rotation with said electrodes and with said dielectric materials in such a way that said blades surround said electrodes and said dielectric material elements.

The disc provided with a series of blades further allows, when it is rotated by the rotating shaft, the fatty substance in liquid form contained in the lower part of the enclosure to be taken and brought into the upper part of the enclosure so the fatty substance is spread over the electrodes and over the dielectric material elements. In this way, the film of fatty substance formed on the surface of the electrodes and the dielectric material elements is continually renewed, which further improves the effectiveness of the processing of the fatty substance.

Advantageously, the immersion device of the device according to the invention further comprises said first fatty substance outlet, situated in a lower part of the enclosure and said first fatty substance inlet, situated in an upper part of the enclosure.

In this way, the circulation of the oil outside the enclosure and its return via the first fatty substance inlet of the enclosure also allows said fatty substance to be dumped over the upper part of the electrodes and the dielectric material elements.

In an advantageous embodiment of the device according to the present invention, said enclosure also has at least one inclined surface for guiding the fatty substance to the first fatty substance outlet of the vessel.

This inclined surface for guiding allows the fatty substance to be supplied to said fatty substance outlet in the enclosure so as to further facilitate the circulation of said fatty substance outside the enclosure.

Preferably, each dielectric material element is chosen from the group composed of a glass, a Pyrex, a rigid polymer and mixtures thereof. For example, the rigid polymer has a dielectric constant at 50 Hz greater than or equal to 1.9 and advantageously an operating temperature greater than or equal to 80° C.

In a particular embodiment of the device according to the invention, at least one, preferably each, dielectric material element is in the form of a disc having a diameter ranging between 5 cm and 40 cm, preferably between 10 cm and 30 cm, advantageously between 10 cm and 35 cm and a thickness ranging between 0.5 mm and 10 mm, preferably between 1 mm and 6 mm.

In another embodiment, at least one, preferably each, dielectric material element is in the form of a polygon, preferably a rectangle having a thickness ranging between 0.5 mm and 10 mm, preferably between 1 mm and 3 mm.

The invention advantageously further comprises a pressure gauge placed in the enclosure and arranged to measure the gas pressure in the enclosure.

The pressure gauge is a capacitive vacuum gauge, for example of the MKS brand, which allows the gas pressure in the enclosure to be measured.

During the oil processing, the first gas, for example, hydrogen, is consumed; the pressure in the enclosure thus tends to decrease as a result of the oil processing time. The pressure gauge allows the gas pressure in the enclosure to be measured and therefore to know when it is necessary to inject a quantity of the first supplementary gas to maintain a constant gas pressure in the enclosure.

Additionally, in a particular embodiment, the device further comprises a controller arranged to be connected to said pressure gauge and connected to a flowmeter, said controller being arranged to control the flowmeter, said flowmeter being arranged to be in fluid connection with said second inlet for a first gas of the enclosure to measure the quantity of said first gas injected into the enclosure by said second inlet for a first gas of the enclosure.

When the pressure gauge measures a gas pressure in the enclosure which is too low, a gas injection is made via the second inlet for gas of the enclosure and the quantity of gas injected is advantageously controlled thanks to the flowmeter.

In a particular embodiment, the device further comprises a viscometer having a first inlet arranged to be in fluid connection with said first liquid fatty substance outlet of the enclosure and a first outlet arranged to be in fluid connection with said filter inlet, said viscometer being arranged to measure the viscosity of said liquid vegetable material between said enclosure and said metal filter.

The viscometer placed between the enclosure outlet and the metal filter thus allows the viscosity of the fatty substance to be measured during its circulation outside the enclosure in order to obtain measurements throughout the fatty substance processing. This viscosity measurement allows the control of the viscosity properties of the processed fatty substance to be further improved. For example, the viscometer is of Sofraser MIVI-type with an internal temperature measurement, the viscosity measurement being via a vibrating rod of stainless steel.

The invention advantageously further comprises a circulation pump having a first inlet in fluid connection with said first outlet of the enclosure and a first outlet in fluid connection with said first inlet of the viscometer, said circulation pump being arranged to circulate said liquid vegetable material between said first outlet and said first inlet of the enclosure.

For example, the circulation pump is a circulation pump of BMF5 corma-type working, for example, at 1,400 rpm.

Furthermore, advantageously, the device according to the invention also has an electrical heating system placed around the enclosure to heat said enclosure containing said fatty substance.

The heating system further allows the temperature of the enclosure to be controlled and to keep it constant, despite the temperature fluctuations that may occur in the environment of the enclosure. Furthermore, when the fatty substances of fat- or wax-type are used, this heating system allows said fatty substance to be supplied at its melting temperature, in order for it to be in liquid form in the enclosure.

Advantageously, said device according to the present invention further comprises a temperature probe directly submerged in the fatty substance contained in the enclosure in order to be able to continuously measure the temperature of the fatty substance. Preferably, the fatty substance in the enclosure is maintained at a temperature preferably ranging between 50° C. and 70° C. The temperature probe is connected to a controller, itself connected to the heating system in order to control the heating of the enclosure so the temperature of the fatty substance that it contains is controlled and kept constant.

In a particularly advantageous embodiment of the device according to the invention, said enclosure has a removal valve arranged to extract said liquid vegetable material out of the enclosure.

Advantageously, the high-voltage source is directly connected to the electrical connector of the device according to the present invention.

The direct connection of the high-voltage source to the electrical connector placed on the enclosure allows the transport distance of the high voltage to be minimised, and thus the energy losses to be further minimised. The connector is thus, on the one hand, connected to the electrodes by means of the electrical connections and on the other hand directly connected to the high-voltage source.

Thanks to the fact that the high-voltage source is directly connected to the electrical connector placed on the enclosure in the device according to the present invention, the control of the quantity of current applied to the electrodes is improved, the electrical losses are further limited because the distance covered by the high tension is minimised.

Another advantage related to the decrease of the distance covered by the high voltage between the source and the electrical connector is the decrease in risks for the operators. In fact, the high voltage is a source of serious accident for operators working with such devices.

Advantageously, the device according to the invention further comprises a motor arranged to drive the rotating shaft.

For example, the driving motor of the rotating shaft is a cage motor, for example of the bonfilogli brand, working at up to 3,000 rpm. Preferably, the motor is coupled to a bearing box allowing the speed to be increased and reduced in such a way as to be able to work at a speed ranging between 1 and 10 rpm.

Preferably, the device according to the present invention further comprises a rotating electrical connector to ensure the supply of the high-voltage source at low voltage, said rotating connector being placed on the rotating shaft and having a first part attached to the rotating shaft arranged to be electrically connected to the high-voltage source and a second part independent from the rotating shaft arranged to be electrically connected to a low-voltage source.

The rotating electrical connector is a circular connector comprising, for example, a 10-channel MOFLON slip ring.

Other embodiments of the device according to the invention are indicated in the appended claims.

The present invention also relates to a system for the electrical processing of a fatty substance of plant origin comprising a plurality of devices according to the invention, said devices being placed in series and/or in parallel to one another.

Other embodiments of the system according to the invention are indicated in the appended claims.

The present invention also relates to a method for electrical discharge processing of a fatty substance of plant origin by means of a device comprising a series of electrodes comprising a number n of electrodes, where ≥2, a series of dielectric material elements comprising n+1 dielectric material elements, an enclosure arranged to receive said fatty substance and surrounding said series of electrodes and said series of dielectric material elements, said method comprising:

- introducing the fatty substance into said enclosure via the first inlet of said enclosure,
- extracting a second gas out of said enclosure via said first outlet of the enclosure,
- introducing a first gas into said enclosure via said second inlet of the enclosure,
- submerging said series of electrodes and said series of dielectric material elements into the fatty substance and forming a film of fatty substance on the surface of said electrodes and said dielectric material elements, said method being characterised in that it comprises:

- applying a constant and stable current to said series of electrodes connected to an electrical connector placed on the outer surface of the enclosure by means of a series of electrical connections in order to apply the same amount of current to each electrode of the series of electrodes, said electrical connector itself being connected to a high-voltage source,
- filtering said fatty substance through a filter having an inlet in fluid connection with said first fatty substance outlet of the enclosure and an outlet in fluid connection with said first fatty substance inlet of the enclosure.

The method according to the present invention allows the processing of the fatty substance of plant origin using a plasma to be carried out in an enclosure containing a first gas, for example, an inert gas, preferably reduced-pressure hydrogen. The plasma is created between the electrodes which are partially submerged in the oil.

The application of a constant and stable high voltage directly to said first electrode by means of a connector allows the control of the voltage applied to the electrodes to be improved. This results in the formation of an intense plasma which is very effective on the oil, which improves the effectiveness of the oil processing.

A low-pressure homogeneous plasma is thus created in the enclosure and the formation of electrical arcs is minimised.

Another advantage of the method according to the invention is that it allows circulation of the oil outside the processing enclosure throughout the period of processing using plasma, so it passes through a filter to eliminate the agglomerates potentially formed during processing. The liquid vegetable material is then reinjected into the enclosure where its processing may be pursued when it passes between the electrodes before being transported towards the metal filter again, and so on throughout the processing period. This results in an improvement of the effectiveness of the oil processing and an improvement of the quality and control of the physicochemical properties of the resulting lubricating product.

This results in obtaining a lubricating oil whose properties are adjustable and controlled depending on the desired further application.

The oil obtained following the processing in the device according to the present invention is preferably characterised by a relaxation time of less than or equal to 200 s measured at 40° C. by a cone-plate viscometer, according to the ISO 2884-1 standard. The relaxation time corresponds to the time necessary for the lubricating substance, which has viscoelastic properties, to return to its initial state when it is subjected to shearing stress. A stress is applied to a sample of lubricating vegetable oil and the resulting response to this stress is monitored over time.

The device according to the present invention thus allows an oil to be processed and a processed oil having appropriate viscoelastic properties to be obtained. For example, the processed oil in the device according to the invention, even when it is subjected to a stress, particularly in engines, quickly returns to its initial viscosity after the application of this stress. This feature of relaxation time of less than or equal to 200 s allows the oil to maintain a relatively stable and constant viscosity over time despite the application of stresses.

Advantageously, the method according to the invention is characterised in that the high voltage applied to the first electrode ranges between 500V and 10 kV at a frequency ranging between 1 Hz and 500 kHz.

The plasma is formed by the application of an alternative high voltage ranging between 500V and 10 kV having a frequency ranging between 1 kHz and 500 kHz between the first and second electrodes.

In a particular embodiment of the method according to the invention, the formation of a film of fatty substance on the surface of said electrodes and said dielectric materials is obtained by spraying said electrodes and said dielectric materials, thanks to circulation of said fatty substance between the first fatty substance outlet of the enclosure and said first fatty substance inlet of the enclosure.

Preferably, the device according to the invention further comprises an axis of rotation passing through an axis of rotation of said electrodes of said series of electrodes, by an axis of rotation of said dielectric materials of the series of dielectric materials and by an axis of rotation of said enclosure, and the method further comprises the formation of a fatty substance film on the surface of said electrodes and said dielectric materials obtained by rotation of said electrodes and said dielectric materials by means of a rotating shaft.

The enclosure, the electrodes as well as the dielectric material elements are rotated by means of the rotating shaft. In fact, this rotating shaft allows the enclosure and/or the electrodes and the dielectric material elements to be rotated in a unique and predetermined rotational direction. The rotational speed of the enclosure and/or the electrodes and dielectric material may be between 1 and 20 rpm. Given that, preferably, a third of the surface of the electrodes is submerged in the oil, while the electrodes are rotated around the rotating shaft, the formation of a relatively homogeneous film of oil on the surface of the electrodes is observed. This film, uniformly distributed over the surface of the electrodes and the dielectric material elements, allows the contact surface between the oil and the plasma to be increased and thus allows the processing yield to be improved.

Preferably, the method of electrical discharge processing the fatty substance of plant origin is implemented by means of the device according to the present invention.

Other embodiments of the method according to the invention are indicated in the appended claims.

BRIEF DESCRIPTION OF THE SEVERAL VIEWS OF THE DRAWINGS

Other features, details and advantages of the invention will become clear from the description given below, in a non-limiting manner and referring to the appended drawings.

In the figures, the identical or similar elements bear the same references.

DESCRIPTION OF SPECIFIC EMBODIMENTS OF THE INVENTION

Figure 1:
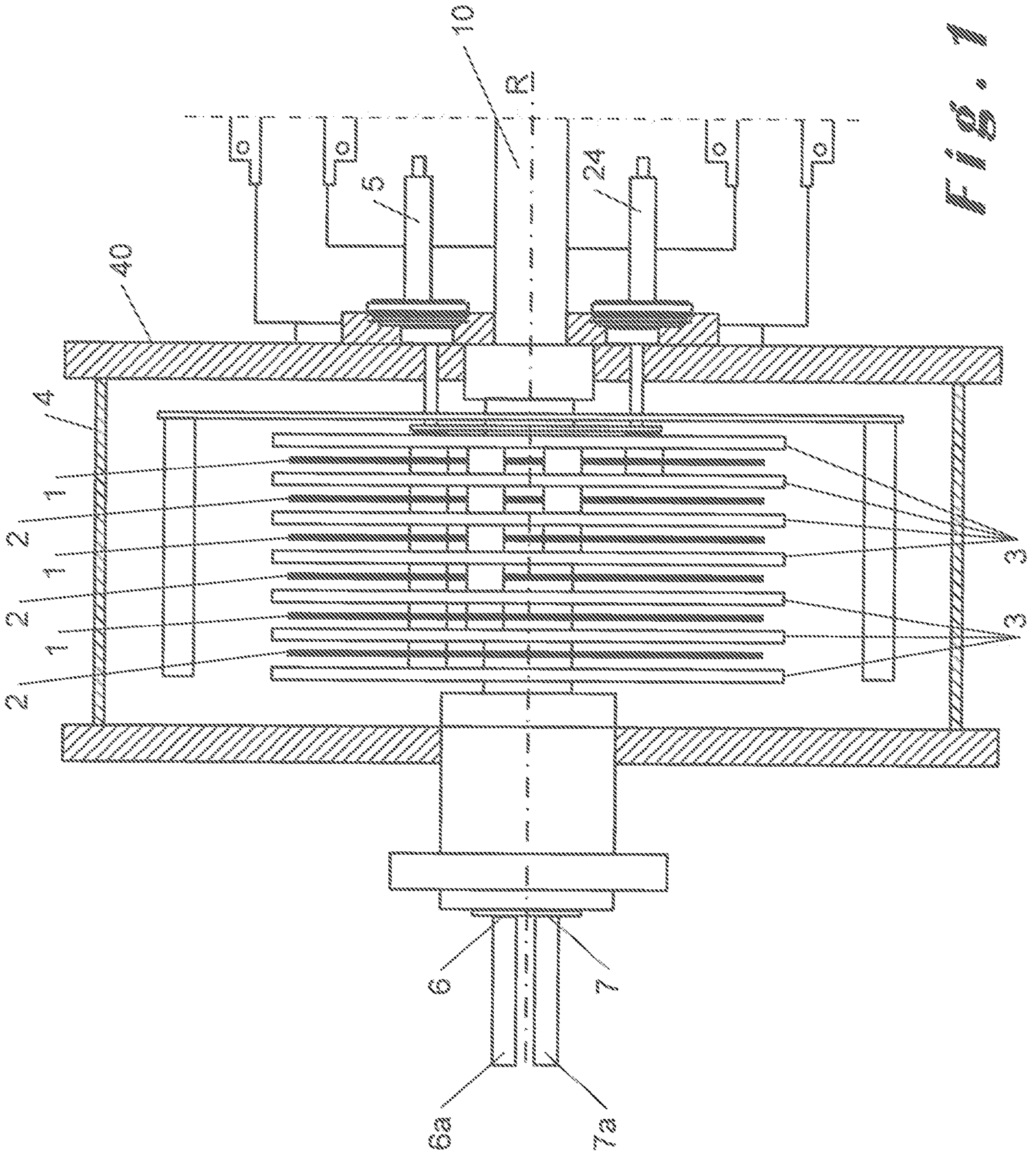
FIG. 1 is a sectional view of a detail of the device according to the invention, whose enclosure has a circular section.

FIG. 1 illustrates a preferred embodiment of the device according to the invention in which a cross section of a cylindrical enclosure 4 capable of receiving a fatty substance can be seen. This enclosure 4 contains a series of electrodes wherein the first electrodes 1 are connected to the high-voltage source and the second electrodes 2 are grounded. The first 1 and second 2 electrodes are placed in alternation with each other. A first electrode 1 thus faces a second electrode 2, and so on so that two electrodes of the same type are not in sequence. Dielectric materials 3 are placed on each side of each of the electrodes 1 and 2 so that an electrode 1 or 2 is between two dielectric materials 3. In FIG. 1, said first 1 and said second 2 electrodes are metal discs having a diameter ranging between 10 and 30 cm and a thickness ranging between 1 and 3 mm. In FIG. 1, said dielectric material elements 3 are also discs having a common axis of rotation R with said first 1 and said second 2 electrodes and having a diameter ranging between 12 and 32 cm and a thickness ranging between 1 and 6 mm. Furthermore, the dielectric material elements 3 are preferably glass, Pyrex or rigid polymer.

The device according to the present invention is further characterised by the presence of an electrical connector 5 placed on the outer surface 40 of the enclosure 4, the electrical connector 5 being connected to the electrodes 1 by the electrical connections. The number of electrical connections is equal to the number of firsts 1 so that each of the first electrodes is connected by an electrical connection to the electrical connector 5. The current flow distances of the electrical connections are equal to one another in order to minimise the energy losses.

Figure 5:
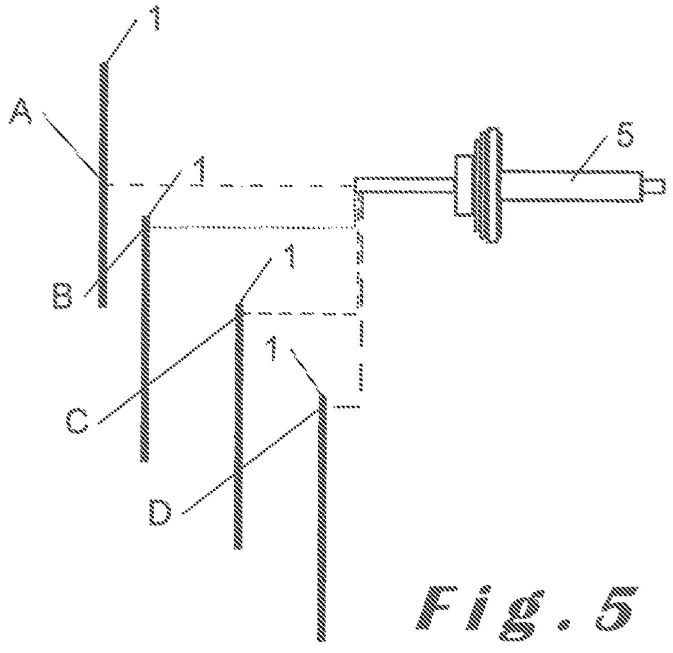
FIG. 5 schematically illustrates the electrical connections shown in FIG. 1.

FIG. 5 is a detail allowing the current cover distances which are identical for all the first electrodes 1 to be schematically illustrated. In fact, in FIG. 5 it can be observed that the electrical connections A, B, C and D of each first electrode are implemented in such a way that the current cover distance is identical for each electrode. The first electrode 1 situated furthest from the electrical connector 5 is thus connected to electrical connection A of identical length to electrical connection D of the first electrode 1, the closest to the electrical connector 5. In this way, the energy losses are limited and identical to each first electrode 1 and the current applied to this first electrode 1 is more stable and more homogeneous.

The enclosure 4 also comprises a first fatty substance inlet 6 connected to a supply pipe 6*a* and a first fatty substance outlet 7 connected to an outlet pipe 7*a*. The fatty substance is thus supplied via the supply pipe 6*a*, through the first fatty material inlet and placed in the enclosure until it reaches a volume of approximately ⅓ to ½ of the volume of the enclosure.

Figure 2:
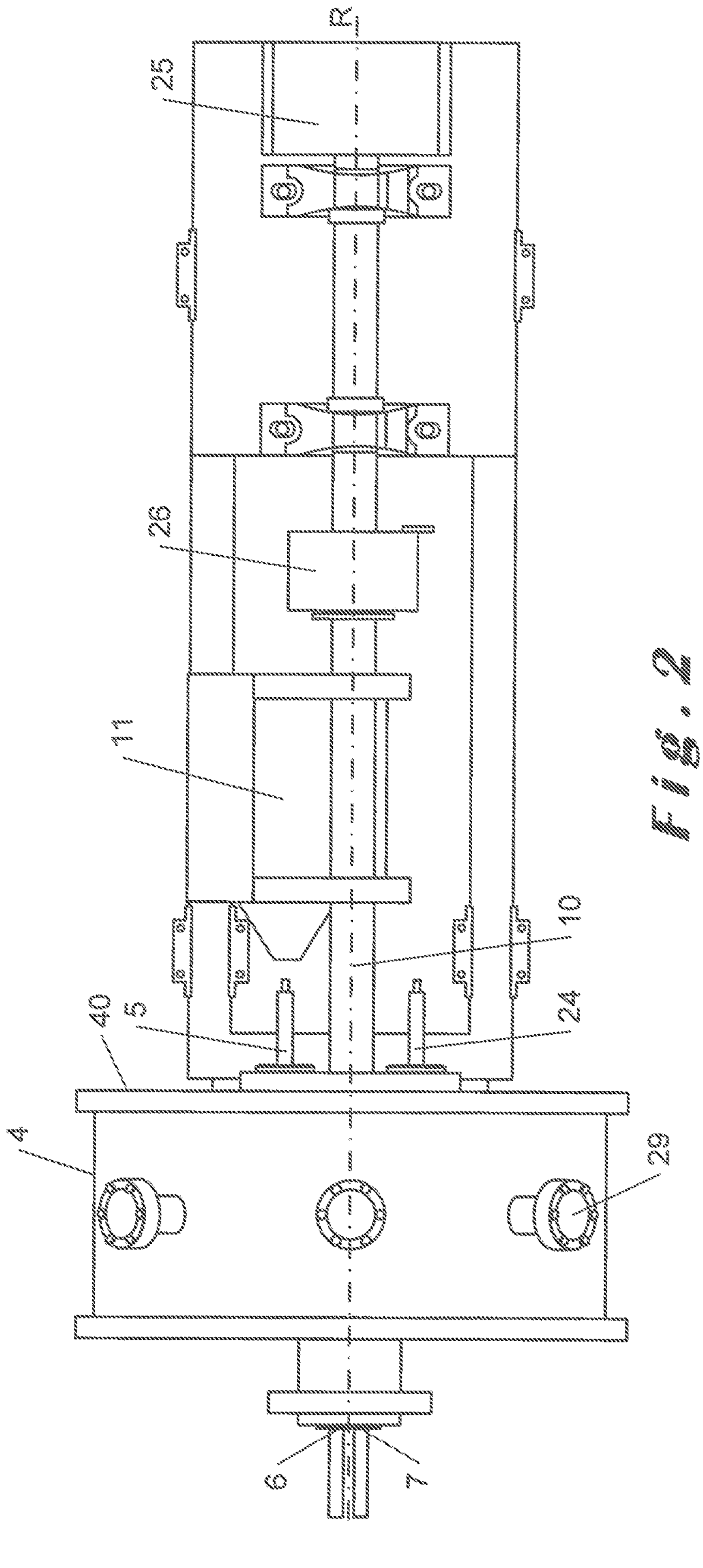
FIG. 2 shows a particular embodiment of the device according to the present invention when viewed from above.

In FIGS. 1 and 2, a second electrical connector 24 is present on the outer surface 40 of the enclosure 4 to connect the two electrodes 2 serving as ground electrodes. In this way, the first electrodes 1 are connected to the high-voltage source 11 and are thus supplied by current while the second electrodes are grounded and serve as ground electrodes.

FIG. 2 is a view from above of the device according to the present invention. This figure shows a high-voltage source 11 arranged to be connected to the connector 5 present on the outer surface 40 of the enclosure 4. The high-voltage source 11 is thus connected to the first electrodes 1 by means of the connector 5 placed on the enclosure and the electrical connections.

The device shown in FIGS. 1 and 2 has an immersion device for the series of electrodes 1 and 2 and the series of dielectric material elements 3 comprising a rotating shaft 10 passing through an axis of rotation R of said first 1 and second 2 electrodes, through an axis of rotation R of said dielectric material elements and through an axis of rotation R of the enclosure 4. In this embodiment, the axes of rotation of the electrodes 1 and 2, the dielectric material elements 3 and the enclosure 4 coincide to form a unique and common axis of rotation R. This results in the electrodes 1 and 2 and the dielectric material elements 3 being placed on the rotating shaft 10 in the enclosure 4. The enclosure and/or the electrodes 1 and 2 and the dielectric materials 3 are attached to the rotating shaft 10 and may thus rotate when the shaft is driven by an engine 25. The rotating shaft of the device thus allows the enclosure 4, or the series of electrodes 1 and 2 and the series of dielectric material elements 3 or the enclosure 4, the series of electrodes 1 and 2 and the series of dielectric material elements 3 to be rotated. This means that the enclosure 4 may be rotated while keeping the electrodes 1 and 2 and the dielectric material elements 3 fixed or inversely the electrodes 1 and 2 and the dielectric material elements 3 may be rotated while keeping the enclosure 4 fixed. The rotation, preferably at a rotating speed ranging between 1 and 10 rpm, of the enclosure 4 and/or the elements it contains allows a film of fatty substance to be formed on the electrodes 1 and 2 and on the dielectric material elements 3 in order to be able to process said fatty substance using the plasma created between said first 1 and said second 2 electrodes.

The rotating shaft 10 may be driven to rotate by an engine 25. In this way, when the enclosure 4, the electrodes 1 and 2 and the dielectric materials 3 are attached to the rotating shaft 10, the rotational movement forms a homogeneous film of oil on the surface of the electrodes 1 and 2 and the dielectric material elements 3. In fact, gravitationally, the oil stays in the lower part of the enclosure 4 while the electrodes turn in a continuous way around the axis of rotation R. In this way, the submerged part of the electrodes thus finds itself out of the oil while the part which was not in the oil is submerged, and so on in order to form a homogeneous film of oil on the surface of the electrodes and the dielectric material elements. This film is kept on the surface of the electrodes and the dielectric material elements by the surface tension connected to the specific viscosity of the processed oil.

Preferably, the enclosure 4 shown in FIGS. 1 to 4 further contains a disc 27 fixed to the rotating shaft 10 and provided with a series of blades 28 positioned peripherally on the disc 27 and each of said blades 28 has a longitudinal axis L parallel to an axis of rotation of the disc 27. The disc 27 has a common axis of rotation R with the first 1 second 2 electrodes and with the dielectric material elements 3 in such a way that the blades 28 surround the electrodes 1 and 2 and the dielectric material elements 3.

When they are rotated, thanks to the rotating shaft 10, the blades 28 are immersed in, and then leave, the oil. By this rotational movement, the blades bring the oil removed to the lower part of the enclosure 4 in front of the electrodes 1 and 2 and the dielectric material elements 3 in order to improve the formation of the film of oil on the surface of the electrodes 1 and 2 the dielectric material elements 3.

As can be seen in FIGS. 1 and 2, advantageously, the high-voltage source 11 is directly connected to the electrical connector 5. The electrical losses are thus further limited as the distance covered by the high voltage is minimised, which ensures control of the quantity of current applied to the first electrodes 1.

As presented in FIG. 2, the device also additionally has a rotating electrical connector 26 to ensure the supply of the high-voltage source at low voltage (not shown in the figure), said rotating connector 26 being placed on the rotating shaft 10 and having a first part attached to the rotating shaft 10 arranged to be in electrical connection with the high-voltage source 11 and a second part independent from the rotating shaft 10 arranged to be in electrical connection with a low-voltage source.

Preferably, the enclosure 4 is a cylindrical metal enclosure, for example made of stainless steel. The enclosure 4 is also provided with windows 29 made of a transparent material allowing the interior of the enclosure to be observed.

Figure 3:
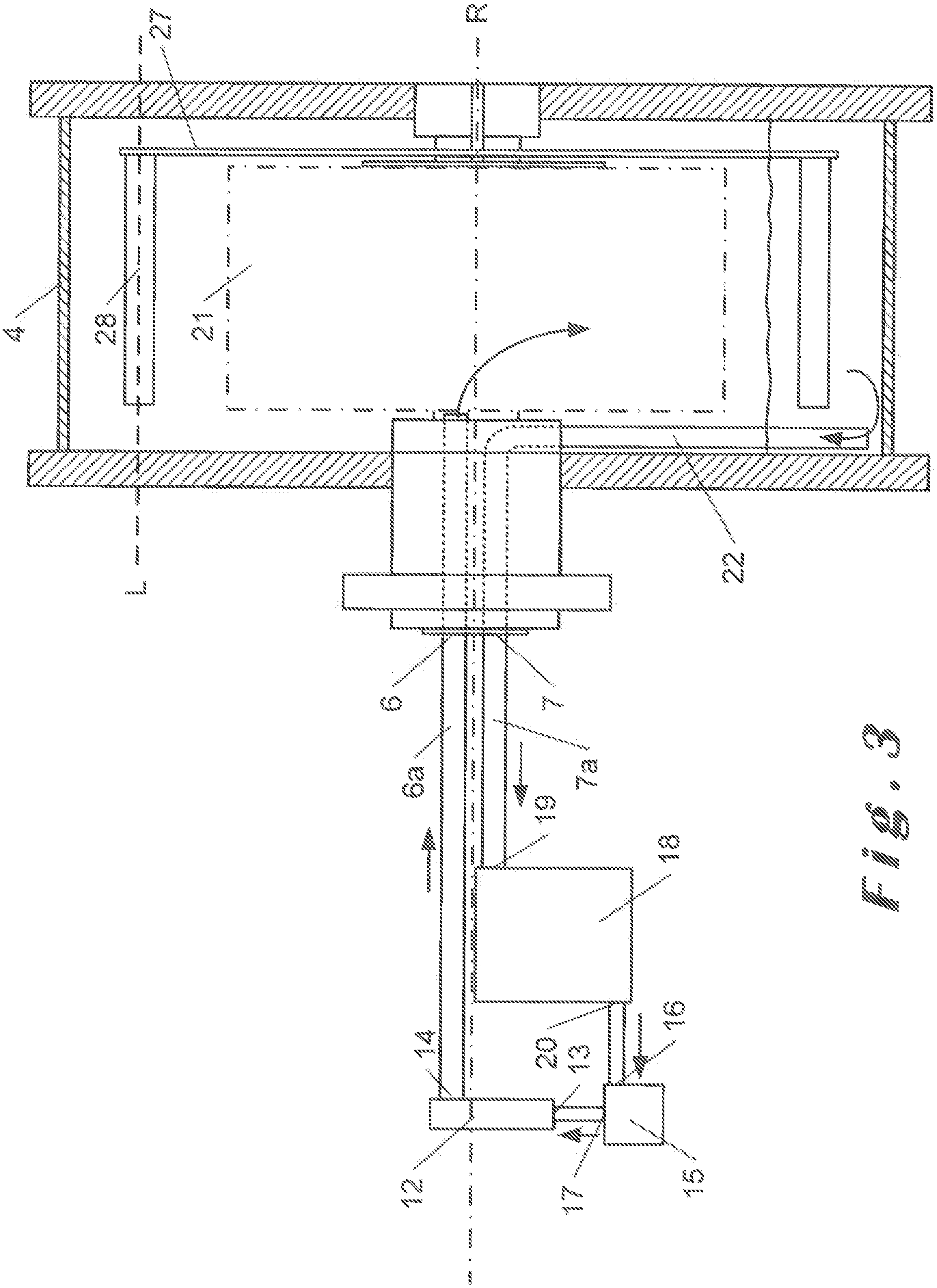
FIG. 3 illustrates another embodiment of the device according to the present invention.

In FIG. 3, the first 1 and second 2 electrodes as well as the dielectric material elements 3 are, for reasons of simplicity, shown as a block 21 in the enclosure 4. FIG. 3 shows a filter 12, for example a metal filter, having a first inlet 13 in fluid connection with the first outlet 7 of the enclosure 4 by means of the pipe 7*a* and a first outlet 14 in fluid connection with the first inlet 6 of the enclosure 4 means of the pipe 6*a*. The liquid is pumped through the pipe 22, exits the enclosure via the outlet 7 and is supplied to the inlet 13 of the filter 12 through the pipe 7*a*. The liquid then passes through the filter 12 and comes out again through the outlet 14 to arrive in the pipe 6*a* before returning to the enclosure 4 via the inlet 6. The circulation of the oil through the meshes of the filter 12 allows the aggregates or agglomerates formed during the processing in the enclosure 4 to be eliminated. The meshes of the filter 12 preferably range between 0.5 mm and 1 mm. The oil is then brought back into the enclosure 4 via a pipe 23 in fluid connection with the first inlet 6 of the enclosure 4.

A viscometer 15 may be placed between the enclosure 4 and the metal filter 12. This viscometer has a first inlet 16 arranged to be in fluid connection with said first outlet 7 via said outlet pipe 7*a* of the enclosure 4 and a first outlet 17 in fluid connection with said inlet 13 of the filter 12, said viscometer 15 being arranged to measure the viscosity of said fatty substance between.

Advantageously, a circulation pump 18 is present between the enclosure 4 and the viscometer 15. This circulation pump 18 has a first inlet 19 in fluid connection with the first outlet 7 of the enclosure 4 via the outlet pipe 7*a* and a first outlet 20 in fluid connection with the first inlet 16 of the viscometer 15. The circulation pump 18 is arranged to circulate said fatty substance between the first outlet 7 and the first inlet 6 of the enclosure 4.

Figure 4:
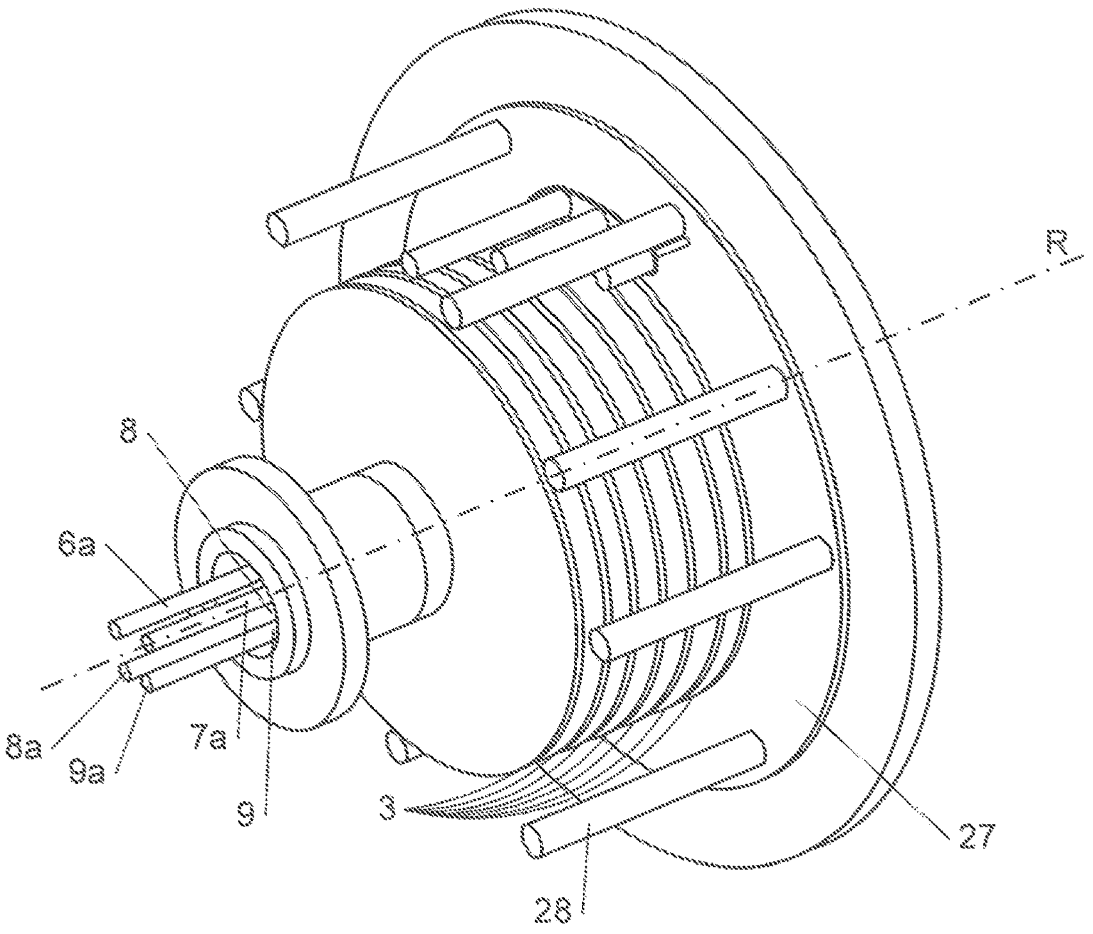
FIG. 4 is a perspective view of the enclosure of the device according to the present invention.

FIG. 4 shows a perspective view of the interior of the enclosure 4 in which the dielectric materials 3 can be seen. The enclosure 4 also has a second inlet 8 connected to a supply pipe 8*a* for a first gas and second outlet 9 connected to an outlet pipe 9*a* for a second gas. The second outlet 9 allows the air contained in the enclosure 4 to be extracted via the outlet pipe 9*a* when the enclosure 4 contains oil and is closed in preparation for the electrical processing. The air contained in the enclosure 4 is then extracted by means of a pumping system (not shown in the figures) in order to create depressurisation, for example in the order of $10^{-2}$ mbar. Preferably, the pumping system used is a vane pump, for example, of the brand Trivac E2. Once the depressurisation is observed in the enclosure 4, an inert gas, preferably hydrogen, is injected via the second inlet 8 via the supply pipe 8*a* of the enclosure 4 until a pressure lower than 100 kPa, preferably lower than 65 kPa, is reached in the enclosure 4.

Figure 6:
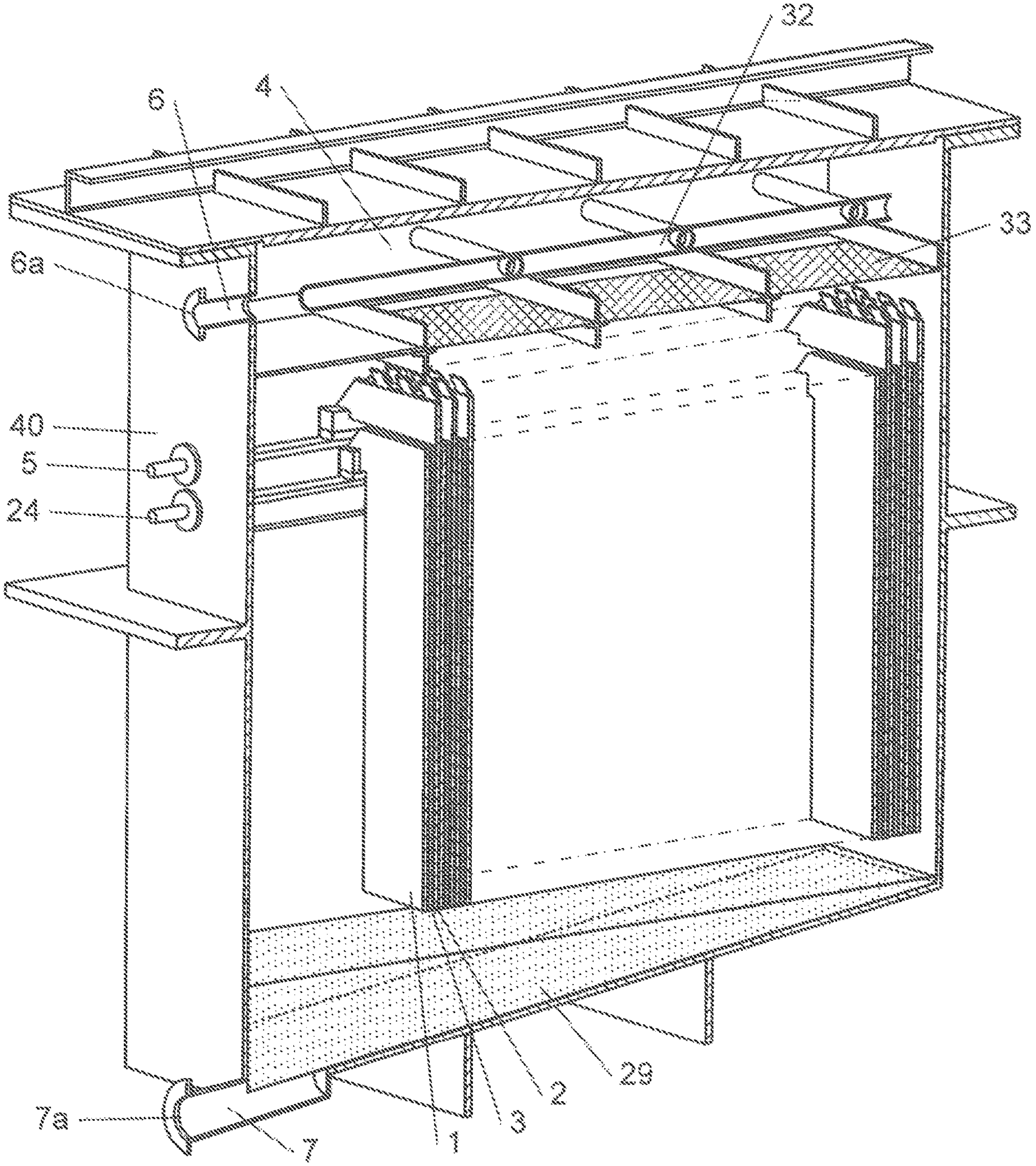
FIG. 6 illustrates a sectional view of a detail of the device for the electrical processing of a fatty substance of plant origin whose enclosure has a rectangular section.

FIG. 6 shows another embodiment of the device according to the present invention wherein the enclosure 4 has a rectangular transverse section. The enclosure 4 contains a series of electrodes 1 and 2 in the form of rectangular metal plates. In this embodiment of the device, the two electrical connectors 5 and 24 placed on the outer surface 40 of the enclosure 4 are connected to the high-voltage source (not shown). The electrical connector 5 is connected via electrical connections to the first electrodes 1 and the electrical connector 24 is connected by means of electrical connections to the second electrodes 2. The first 1 and second 2 are arranged in alternation. The current applied to the electrodes is an alternating current, which means that when the first electrodes 1 are supplied with the current, the second electrodes serve as ground electrodes, and inversely when the current changes direction. Dielectric material elements in the form of rectangular plates are placed on either side of each electrode 1 and 2.

The enclosure 4 also comprises a first fatty substance inlet 6 connected to a supply pipe 6*a* and a first fatty substance outlet 7 connected to an outlet pipe 7*a*. The fatty substance is thus supplied via the supply pipe 6*a*, through the first vegetable material inlet and placed in the enclosure until it reaches a volume of approximately ⅓ to ½ of the volume of the enclosure.

Advantageously, the first fatty substance inlet 6 is situated in an upper part of the enclosure and said fatty substance outlet 7 is situated in a lower part of the enclosure 4.

When the oil is supplied into the enclosure 4 through the first inlet 6, the oil is discharged by means of channels 32 in the upper part of the enclosure 4 to the electrodes 1 and 2 and to the dielectric material elements 3 thus allowing the formation of a film of oil thereon to be improved. This distribution of oil to the electrodes 1 and 2 and to the dielectric materials 3 allows the effectiveness of the oil processing to be further improved. Preferably, a sieve 33 is present between the channels 32 and the series of electrodes 1 and 2 and the series of dielectric material elements 3. Thanks to gravity, the oil is then naturally supplied to the fatty substance outlet 7.

The enclosure 4 further comprises a second inlet 8 (not shown) for a first gas allowing the injection of a gas into the enclosure 4.

Preferably, the enclosure 4 has an inclined surface 29 for guiding the oil towards the first fatty substance outlet 7. This inclined surface 29 allows the supply of oil to the first fatty substance outlet 7 to be further improved.

Figure 7:
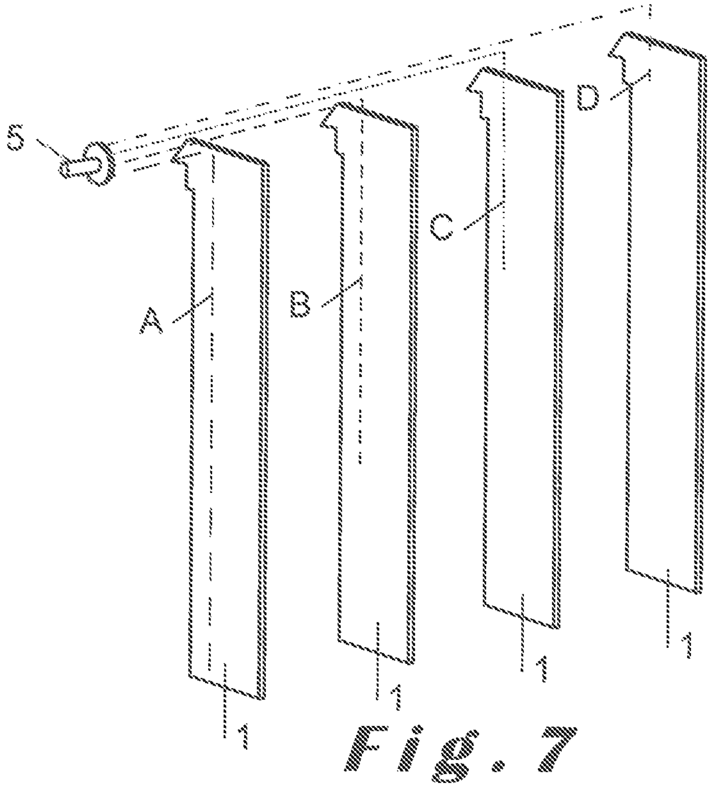
FIG. 7 schematically illustrates the electrical connections shown in FIG. 6.

FIG. 7 illustrates, as in FIG. 5, the electrical connections between the electrical connector 5 and the first electrodes 1. It can be appreciated in FIG. 7 that the current flow distances A, B, C and D are all identical in length. The distance covered by the current from the electrical connector 5 is thus identical for each first electrode 1. These connections allowing an identical current flow distance are equally valid for the second electrodes 2.

Figure 8:
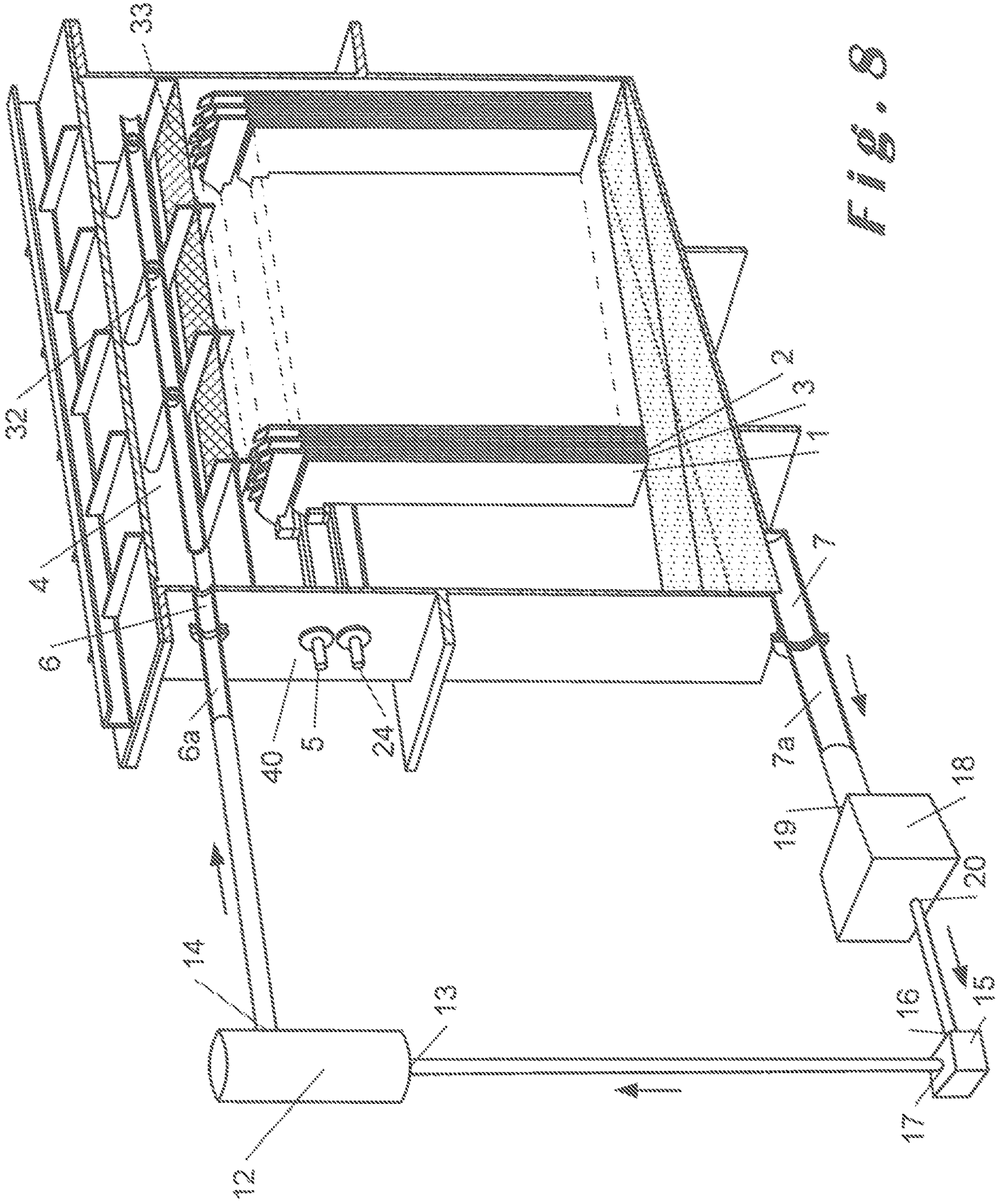
FIG. 8 illustrates another embodiment of the device according to the present invention.

FIG. 8 shows the same elements as FIG. 3. In the embodiment illustrated in FIG. 8, it can be seen that the oil is removed from the lower part of the enclosure 4 through the first fatty substance outlet 7 and, after having circulated through the filter 12, is supplied into the upper part of the enclosure 4. The oil thus arrives in the channels 32, passes through the sieve 33, divides and forms a film on the electrodes 1 and 2 and the dielectric material elements 3. The oil thus finds itself in the lower part of the enclosure 4 where it is guided, thanks to the guiding surface 29, towards the first fatty substance outlet 7 where it may start another external circulation through the filter, and so on throughout the oil processing time.

Advantageously, an electrical heating system (not shown) is placed around the enclosure 4 to heat said enclosure 4 containing said fatty substance. In this way, the temperature of the fatty substance contained in the enclosure 4 may be regulated and kept constant.

In another embodiment, the enclosure 4 has a removal valve (not shown) arranged to extract said fatty substance from the enclosure 4.

A pressure gauge (not shown) may be placed in the enclosure 4 to measure the gas pressure in the enclosure 4. The injection of the gas through the supply pipe 8*a* is advantageously controlled thanks to a mass flowmeter (not shown) of MKS-type calibrated for hydrogen with a high scale of 1,000 sccm (standard cubic centimetres per minute), not shown in the figures.

The device may also comprise a controller (not shown) arranged to be connected to said pressure gauge and connected to the flowmeter. The controller is arranged to control the flowmeter and the flowmeter is in turn arranged to be in fluid connection with the supply pipe 8*a* for a first gas of the enclosure 4 via the second inlet 8. The flowmeter thus allows the quantity of said gas injected into the enclosure 4 by the second inlet 8 via the inlet pipe 8*a* of the enclosure 4 to be controlled.

EXAMPLES

The device according to the present invention has been implemented to process different oils of plant origin. This device comprises a circular enclosure containing a plurality of electrodes connected to a high-voltage source and a plurality of ground electrodes connected to ground. These electrodes are aluminium discs with a diameter of 25 cm and a thickness of 2 mm. The dielectric material elements placed on either side of the electrodes are Pyrex discs with a diameter of 28 cm and a thickness of 5 mm.

2 litres of oil are placed in the enclosure and this is depressurised until it reaches a vacuum of $10^{-2}$ mbar. Hydrogen is then introduced into the enclosure to reach a pressure of 180 Torr.

The enclosure is rotated around a rotating shaft at a speed of 5 rpm.

A voltage of 2,900V is applied to the electrodes, which corresponds to a shock current of 2.5 A, and a frequency of 35 kHz or 66 kHz is used, as specified in the following examples.

The filtration of the oil is carried out throughout the period of processing oil using plasma by means of a circulation pump of corma BMF5-type working at 1,400 rpm, which allows the oil to be carried out of the enclosure. The oil is then filtered through a metal filter having 0.8 mm meshes.

The oils obtained after this treatment were analysed in order to determine their physicochemical properties, particularly the dynamic viscosity, thixotropy and relaxation time.

The dynamic viscosity is measured using an Anton Paar viscometer provided with a cone-plate system, CP50-0.5, according to the ISO 2884-1 standard (Determination of the viscosity by means of rotating viscometers). The measurements are obtained under shearing stress from 0 to 500 $s^{-1}$ by taking 1 point every second, holding for 1 minute at 500 $s^{-1}$ and finally 500 to 0 $s^{-1}$ by taking 1 point every second at a temperature of 40° C.

Thixotropy is a measurement of the variation of the viscosity when the oil is subjected to a stress. It is a physical property of a fluid whose viscosity varies over time when the fluid is subjected to constant stress (or velocity gradient). Thixotropy is a physical phenomenon which results from the lack of immediacy of the processes for destroying and rebuilding of the microscopic structure by stirring and leaving a substance such as oil. Thixotropic behaviour is defined as a behaviour depending on time and is correctly determined when the decomposition and regeneration of the substance tested under constant shearing stress are considered. According to the present invention, the thixotropy of the vegetable oil was measured during a test carried out under constant shearing stress of 1,000 s−1 at a temperature of 40° C. using an Anton Paar viscometer provided with a cone-plate system, CP50-0.5.

According to the present invention, the thixotropy of the oil shows the variation of the viscosity between the initial state and the unstructured state of the oil.

The relaxation time corresponds to the time necessary for the lubricating substance, which has viscoelastic properties, to return to its initial state when it is subjected to a shearing stress. A stress is applied to a sample of lubricating vegetable oil and the resulting response to this stress is monitored over time.

According to the present invention, the relaxation time of the vegetable oil has been measured in an Anton Paar viscometer provided with a cone-plate system (CP50-0.5) by applying a constant shearing speed of 1,000 s−1 at a temperature of 40° C. to the vegetable oil.

The iodine value of a lipid is the diode masse ($I_2$) capable of binding the non-saturations of the triglycerides contained in 100 grams of fatty material.

According to the present invention, the iodine value was measured by the Wijs method which consists of making a known excess of iodine monochloride (ICI) react to the fatty substance to be analysed, i.e. the vegetable oil. The iodine monochloride binds to the double bonds of the analysed sample and the excess reagent remaining in the solution. Potassium iodide is then added excessively to that solution, thus causing the return of the excess cation, I+, in molecular state I2. The diode may be dosed by a solution of known molar concentration of sodium thiosulphate, in the presence of starch solution.

The molar mass is expressed in terms of polystyrene, as determined by steric exclusion chromatography (Agilent) functioning at a rate of 1 mL·min$^{-1}$ at a temperature of 30° C. The samples is solubilised in chloroform at 1 mg·mL$^{-1}$ and are fractionated by passage through two PL GEL MIX-D 10 columns. The columns were previously calibrated by using low dispersity polystyrenes of molar mass ranging between 500 and 106 g·mol$^{-1}$. The detection is performed by a refractive index detector (Agilent DRI).

Example 1

The processing described above was implemented at a frequency of 66 kHz on a rapeseed oil by the AVENO brand and repeated for different predetermined processing times in order to obtain processed vegetable oils, also known as lubricants of different physicochemical properties. These vegetable oils obtained after different processing times have a visually homogeneous structure, without aggregates or agglomerates. These oils have been analysed and have the features listed in Table 1.

TABLE 1

| Processing time (min) | Non-saturations-iodine value | Disappearance of double bond (%) | Mw (g/mol) | Viscosity (mPa s) | Thixotropy (mPa s) | Relaxation time (s) |
|---|---|---|---|---|---|---|
| 0 | 114 | 0 | 1580 | 45 | — | — |
| 460 | 99.9 | 11.6 | 2290 | 68 | — | — |
| 925 | 90.3 | 17.7 | 2940 | 128 | — | — |
| 1315 | 82.8 | 26.8 | 6160 | 374 | 110 | 105 |
| 1955 | 80.2 | 29.1 | 16260 | 1520 | 651 | 180 |
| 2065 | 75.6 | 33.1 | 48000 | 2650 | 1100 | 187 |

Example 2

The processing described above was implemented at a frequency of 35 kHz on a rapeseed oil by the AVENO brand and repeated for different predetermined processing times in order to obtain processed vegetable oils, also known as lubricants of different physicochemical properties. These vegetable oils obtained after different processing times have a visually homogeneous structure, without aggregates or agglomerates. These oils have been analysed and have the features listed in Table 2.

TABLE 2

| Processing time (min) | Non-saturations-iodine value | Disappearance of double bond (%) | Mw (g/mol) | Viscosity (mPa s) | Thixotropy (mPa s) | Relaxation time (s) |
|---|---|---|---|---|---|---|
| 0.0 | 113.0 | 0.0 | 1580.0 | 45.0 | — | — |
| 800.00 | 104.6 | 17.0 | 2800.0 | 57.0 | — | — |
| 1220.0 | 87.1 | 9.7 | 3610.0 | 88.0 | — | — |
| 1810.0 | 88.5 | 20.9 | 5590.0 | 207.0 | 35.0 | <10 |
| 2410.0 | 74.9 | 19.6 | 20880.0 | 588.0 | 154.0 | <10 |
| 2540.0 | 77.9 | 27.8 | 21440.0 | 865.0 | 248.0 | <10 |

TABLE 2-continued

| Processing time (min) | Non-saturations-iodine value | Disappearance of double bond (%) | Mw (g/mol) | Viscosity (mPa s) | Thixotropy (mPa s) | Relaxation time (s) |
|---|---|---|---|---|---|---|
| 2628.0 | 77.9 | 25.3 | 24900.0 | 1150.0 | 301.0 | <10 |
| 2780.0 | 78.2 | 26.9 | 44700.0 | 2300.0 | 590.0 | <10 |

Example 3

The processing described above was implemented at a frequency of 66 kHz on a flaxseed oil by the AVENO brand and repeated for different predetermined processing times in order to obtain processed vegetable oils, also known as lubricants of different physicochemical properties. These vegetable oils obtained after different processing times have a visually homogeneous structure, without aggregates or agglomerates. These oils have been analysed and have the features listed in Table 3.

TABLE 3

| Processing time (min) | Non-saturations-iodine value | Disappearance of double bond (%) | Mw (g/mol) | Viscosity (mPa s) | Thixotropy (mPa s) | Relaxation time (s) |
|---|---|---|---|---|---|---|
| 0 | 177.4 | 0 | 1800 | 40 | 0 | 0 |
| 560 | 147.3 | 17 | 3070 | 150 | 0 | 0 |
| 1160 | 128.9 | 27.4 | 13580 | 392 | 113 | 173 |
| 1255 | 133.3 | 24.9 | 18720 | 650 | 265 | 171 |
| 1315 | 130.4 | 26.5 | 19220 | 1260 | 500 | 170 |

Example 4

The processing described above was implemented at a frequency of 35 kHz on a flaxseed oil by the AVENO brand and repeated for different predetermined processing times in order to obtain processed vegetable oils, also known as lubricants of different physicochemical properties. These vegetable oils obtained after different processing times have a visually homogeneous structure, without aggregates or agglomerates. These oils have been analysed and have the features listed in Table 4.

TABLE 4

| Processing time (min) | Non-saturations-iodine value | Disappearance of double bond (%) | Mw (g/mol) | Viscosity (mPa s) | Thixotropy (mPa s) | Relaxation time (s) |
|---|---|---|---|---|---|---|
| 0.0 | — | 0.0 | 1800.0 | 40.0 | 0.0 | 0.0 |
| 430.0 | 147.3 | 9.7 | 2260.0 | 50.0 | 0.0 | 0.0 |
| 980.0 | 160.3 | 20.9 | 3380.0 | 100.0 | 0.0 | 0.0 |
| 1490.0 | 140.4 | 19.6 | 9780.0 | 250.0 | 94.0 | <10 |
| 1730.0 | 142.7 | 27.8 | 19730.0 | 750.0 | 210.0 | <10 |
| 1820.0 | 132.6 | 25.3 | 26260.0 | 1520.0 | 615.0 | <10 |

In general, particularly based on the results given in these examples, it is observed that, when the processing time of the oil increases, the number of non-saturations, initially present in the oil before the processing, decreases. The molar mass, Mw, as well as the viscosity, increase when the processing time increases.

These examples also highlight that the device according to the present invention allows the production of a vegetable oil processed using plasma whose relaxation time is less than 200 s. The values of relaxation time less than 200 s and reproducible from one processing to another are a good indication of the improved viscoelastic properties of the lubricating vegetable oil obtained thanks to the device according to the present invention. A short relaxation time has the advantage of allowing the oil to return to its initial state when it is subjected to a stress, for example when it is used in an engine. Furthermore, this oil has a thixotropy of between 5% and 30% viscosity. It can thus be concluded that the device according to the present invention allows a vegetable oil, lubricating, to be obtained, having an improved and controlled viscosity all while having adequate and controlled viscoelastic and thixotropic properties.

In fact, it can be seen in the examples given above that the device according to the present invention allows the processing of vegetable oils of different origins, particularly those from rapeseed or flaxseed, to be carried out. As shown by the examples, it is possible to control particularly the viscosity of the oil obtained after the processing by adjusting the processing time all while maintaining a thixotropy of lower than 30% of the viscosity and a relaxation time of less than 200 s. It is, therefore, possible to produce processed vegetable oils in a wide range of viscosities all while controlling the physicochemical properties of these oils thanks to the device according to the present invention.

It is understood that the present invention is in no way limited to the embodiments described above and that modifications may be made without departing from the scope of the appended claims.

What is claimed is:

1. A device for the electrical processing of a fatty substance of plant origin comprising:

a series of electrodes comprising a number n of electrodes (1 and 2), where n≥5, substantially parallel, each electrode being arranged to be connected to a high-voltage source and/or a ground, a series of dielectric material elements (3) separating the electrodes (1 or 2) of the series of electrodes, an enclosure (4) arranged to receive said fatty substance, and surrounding said series of electrodes (1 and 2) and said series of dielectric material elements (3), an engine (25) or a circulation pump (18) adapted to drive a submission of said series of electrodes (1 and 2) and said series of dielectric material elements (3) in the fatty substance contained in the enclosure for a formation of a film of oil on a surface of said series of electrodes (1 and 2) and said series of dielectric material elements (3), wherein the device further comprises:

at least one electrical connector (5), said connector (5) being configured to be connected to the high-voltage source (11)

a series of electrical connections comprising n electrical connections so as to connect each electrode of said series of electrodes to said electrical connector (5), each electrical connection having a predetermined current flow distance, the current flow distances of the electrical connections being equal to one another.

2. The device according to claim 1, wherein at least one electrical connector (5) is placed on the outer surface (40) of the enclosure (4).

3. The device according to claim 1, wherein the high-voltage source (11) is directly connected to said electrical connector (5).

4. The device according to claim 1, wherein the series of dielectric material elements (3) comprises n+1 dielectric material elements substantially parallel to said electrodes (1 and 2) and placed on either side of each electrode (1 or 2) of the series of electrodes so that each electrode (1 or 2) is found between two dielectric material elements (3).

5. The device according to claim 1, wherein said engine is connected to a rotating shaft (10) which is attached to said electrodes (1 and 2) and to said dielectric material elements (3).

6. The device according to claim 5, further comprising a rotating electrical connector (26) to ensure the supply of the high-voltage source at low voltage, said rotating electrical connector (26) being placed on the rotating shaft (10) and having a first part attached to the rotating shaft (10) arranged to be in electrical connection with the high-voltage source (11) and a second part independent from the rotating shaft (10) arranged to be in electrical connection with a low-voltage source.

7. The device according to claim 1, wherein said engine is connected to a rotating shaft (10) attached to the enclosure (4).

8. The device according to claim 5, further comprising, in the enclosure (4), a disc (27) fixed to the rotating shaft (10) and arranged to be rotated by said shaft (10), and provided with a series of blades (28) peripherally positioned on said disc (27), each of said blades (28) having a longitudinal axis (L) parallel to an axis of rotation of said disc (27), said disc (27) having a common axis of rotation (R) with said electrodes (1 and 2) and with said dielectric material elements (3) so that said blades (28) surround said electrodes (1 and 2) and said dielectric material elements (3).

9. The device for the electrical processing of a fatty substance of plant origin comprising:

a series of electrodes comprising a number n of electrodes (1 and 2), where n≥2, substantially parallel, each electrode being arranged to be connected to a high-voltage source and/or a ground, a series of dielectric material elements (3) separating the electrodes (1 or 2) of the series of electrodes, an enclosure (4) arranged to receive said fatty substance, and surrounding said series of electrodes (1 and 2) and said series of dielectric material elements (3), a circulation pump (18) adapted to drive a submission of said series of electrodes (1 and 2) and said series of dielectric material elements (3) in the fatty substance contained in the enclosure for a formation of a film of oil on a surface of of said series of electrodes (1 and 2) and said series of dielectric material elements (3), wherein the enclosure (4) is further provided with:

a first inlet (6) for the fatty substance and a first outlet (7) for the fatty substance, and a second inlet (8) for a first gas and a second outlet (9) for a second gas, wherein the circulation pump (18) having a first inlet (19) and a first outlet (20), said circulation pump (18) being arranged to circulate said fatty substance between said first outlet (7) and said first inlet (6) of the enclosure (4), wherein said first outlet is situated in a lower part of the enclosure, and said first inlet, situated in an upper part of the enclosure, wherein the circulation of the fatty substance outside the enclosure and its return via the first inlet allows said fatty substance to be distributed over the upper part of the electrodes and the dielectric elements.

10. The device according to claim 9, further comprising channels (32) in the upper part of the enclosure (4) for discharging the fatty substance to the electrodes and the dielectric material elements.

11. The device according to claim 10, further comprising a sieve (33) between the channels (32) and the electrodes and dielectric material elements.

12. The device according to claim 9, further comprising a filter (12) having an inlet (13) in fluidic connection with said first outlet (7) of the enclosure (4) and an outlet (14) in fluidic connection with said first inlet (6) of the enclosure (4), wherein the circulation pump is arranged to circulate said fatty substance between said first outlet (7) and said first inlet (6) of the enclosure (4) via the filter.

13. The device according to claim 9, further comprising a viscometer (15) having a first inlet (16) arranged to be in fluidic connection with said first outlet (7) of the enclosure (4) and a first outlet (17) arranged to be in fluidic connection with said inlet (13) of the filter (12), said viscometer (15) being arranged to measure the viscosity of said fatty substance between said enclosure (4) and said filter (12).

14. The device according to claim 9, wherein said enclosure (4) also has at least one inclined surface for guiding the fatty substance towards said first outlet (7) of the enclosure (4).

15. The device according to claim 9, further comprising a pressure gauge placed in the enclosure (4) and arranged to measure the gas pressure in the enclosure (4).

16. The device according to claim 15, further comprising a controller arranged to be connected to said pressure gauge and connected to a flowmeter, said controller being arranged to control the flowmeter, said flowmeter being arranged to be in fluidic connection with said second inlet (8) for a first gas of the enclosure (4) to measure the quantity of said gas injected into the enclosure (4) via said second inlet (8) for a first gas of the enclosure (4).

17. The device according to claim 9, further having an electrical heating system placed around the enclosure (4) to heat said enclosure (4) containing said fatty substance.

18. The device according to claim 9, wherein said enclosure (4) has a removal valve arranged to extract said fatty substance from the enclosure (4).

* * * * *